United States Patent [19]
Alaze et al.

[11] Patent Number: 5,167,442
[45] Date of Patent: Dec. 1, 1992

[54] HYDRAULIC BRAKE SYSTEM FOR MOTOR VEHICLES

[75] Inventors: Norbert Alaze, Markgroeningen; Friedrich Megerle, Asperg; Werner Wilde, Schwieberdingen; Guenter Kaes, Stuttgart, all of Fed. Rep. of Germany

[73] Assignee: Robert Bosch GmbH, Stuttgart, Fed. Rep. of Germany

[21] Appl. No.: 788,382

[22] Filed: Nov. 6, 1991

[30] Foreign Application Priority Data

Dec. 22, 1990 [DE] Fed. Rep. of Germany ....... 4041506

[51] Int. Cl.⁵ .......................... B60K 28/16; B60T 8/36
[52] U.S. Cl. .......................... 303/113.2; 251/129.02; 251/129.19; 303/116.1; 303/119.2; 303/900; 303/901
[58] Field of Search ...... 303/119 SV, 119 R, 113 TR, 303/68, 113 R, 113 TB, 115 R, 115 PP, 116 R, 116 SP, 116 WP, 116 PC, DIG. 6, 69, 110, DIG. 5; 251/129.19, 129.02, 83; 137/901; 188/181 R

[56] References Cited

U.S. PATENT DOCUMENTS

| | | | |
|---|---|---|---|
| 2,121,657 | 6/1938 | Fisher | 251/129.19 X |
| 3,325,139 | 6/1967 | Diener et al. | 251/129.02 |
| 3,818,927 | 6/1974 | Zeuner | 251/129.02 X |
| 3,829,060 | 8/1974 | Lewis | 251/129.02 |
| 3,970,282 | 7/1976 | Hansen | 251/129.19 X |
| 4,008,876 | 2/1977 | Bastle | 251/129.19 |
| 4,304,258 | 12/1981 | Mitchell | 251/129.19 X |
| 4,392,634 | 7/1983 | Kita | 251/129.19 |
| 4,601,458 | 7/1986 | Sheppard | 251/129.19 |
| 4,611,631 | 9/1986 | Kosugi et al. | 251/129.19 X |
| 4,703,979 | 11/1987 | Nakanishi et al. | 303/116 R |
| 4,712,767 | 12/1987 | Losser et al. | 251/129.19 X |
| 4,861,116 | 8/1989 | Bernhardt et al. | 303/113 TR |
| 4,898,430 | 2/1990 | Becker-Endrigkeit et al. | 303/13 TR |
| 4,922,966 | 5/1990 | Kaes et al. | 251/129.19 X |
| 4,952,002 | 8/1990 | Arikawa et al. | 303/116 R |
| 5,058,961 | 10/1991 | Mergenthaler et al. | 303/68 X |
| 5,076,538 | 12/1991 | Mohr et al. | 303/119 SV X |
| 5,076,647 | 12/1991 | Grana et al. | 303/68 X |

FOREIGN PATENT DOCUMENTS

| | | |
|---|---|---|
| 0334029 | 9/1989 | European Pat. Off. . |
| 0355055 | 2/1990 | European Pat. Off. . |
| 0030533 | 5/1956 | Fed. Rep. of Germany ........................ 251/129.19 |
| 3842699 | 6/1990 | Fed. Rep. of Germany ... 303/116 R |
| 4034113 | 4/1992 | Fed. Rep. of Germany . |

*Primary Examiner*—Douglas C. Butler
*Attorney, Agent, or Firm*—Edwin E. Greigg; Ronald E. Greigg

[57] ABSTRACT

A structurally simplified brake system which increases its functional reliability. The brake system has a brake pressure line extending between a master brake cylinder and a wheel brake. A shutoff valve is connected in parallel with a pressure limiting valve disposed in the brake line. A high-pressure pump toward the wheel brake side is capable of feeding pressure fluid into the line when the shutoff valve is closed. If a response pressure of the pressure limiting valve is exceeded, the pressure fluid can be diverted back to the master cylinder. The shutoff valve has a valve seat toward the wheel brake and a closing member toward the master cylinder which closing member is capable, by the action of a magnetic force on an armature of engaging the valve seat. A compression spring is disposed between the armature and the closing member and in the valve closing position exerts a closing force, adapted to the response pressure, upon the closing member. The shutoff valve and the pressure limiting valve are thus attained in a single valve unit.

2 Claims, 2 Drawing Sheets

HYDRAULIC BRAKE SYSTEM FOR MOTOR VEHICLES

BACKGROUND OF THE INVENTION

The invention is based on a hydraulic brake system having an anti-skid and traction control apparatus for motor vehicles defined hereinafter.

A brake system is known (German Patent Application P No. 40 34 113.5 published Apr. 30, 1992) in which the shutoff valve and the pressure limiting valve are embodied structurally independently of one another. The pressure limiting valve disposed parallel to the shutoff valve becomes operative if the consumer (wheel brake) cannot take the pressure fluid, fed into the line (brake line) by the pressure source (high-pressure pump) when the shutoff valve is closed. To prevent damage from an impermissibly high pressure increase in the line and in the pressure source, the pressure limiting valve opens at a predetermined response pressure, so that some of the pressure fluid can flow out to the pressure generator (master brake cylinder). The pressure limiting valve, embodied as a seat valve, executes a very small stroke in this process. This stroke is inadequate to make the pressure limiting valve open for the passage of foreign bodies entrained by the pressure fluid, such as material rubbed off from seals or metal and the like; that is, the foreign bodies become deposited on the valve seat and impair the function of the pressure limiting valve.

OBJECT AND SUMMARY OF THE INVENTION

The brake system according to the invention has an advantage over the prior art that the seat valve, embodied by the valve seat and the closing member, of the shutoff valve, in the valve closing position, jointly takes on the function of the pressure limiting valve if the pressure toward the consumer exceeds the response pressure. It is true that the closing member executes only a very short stroke in limiting the pressure; however, when the shutoff valve switches to its open position, in which a pressure-limiting function is unnecessary, the closing member executes a very much longer stroke. This makes it possible for foreign bodies to pass through the valve. Foreign bodies that have been deposited on the seat valve are now flushed out in the pressure limiting function. This increases the functional reliability of the brake system. The savings in terms of space and cost with the embodiment according to the invention are also advantageous. Since the closing force generated by the compression spring is less than the magnetic force acting upon the armature, noise abatement and a reduction of wear at the valve seat are also attained.

One advantage of the invention is that despite the interposition of a compression spring between the armature and the tappet, an increase in the axial structural length of the shutoff valve is avoided. In another feature of the invention, the compression spring is made operative for the pressure limiting function by simple means in the valve closing position. In the open position, however, the flow of force of the compression spring is closed via the armature, so that the predominant portion of the opening and closing stroke of the armature is free of the force of the compression spring.

In another feature of the invention, adjusting of the biasing force of the compression spring interpolated in the blind bore is attainable in a simple manner.

The invention will be better understood and further objects and advantages thereof will become more apparent from the ensuing detailed description of a preferred embodiment taken in conjunction with the drawings.

DESCRIPTION OF THE PREFERRED EMBODIMENT

Figure 1:
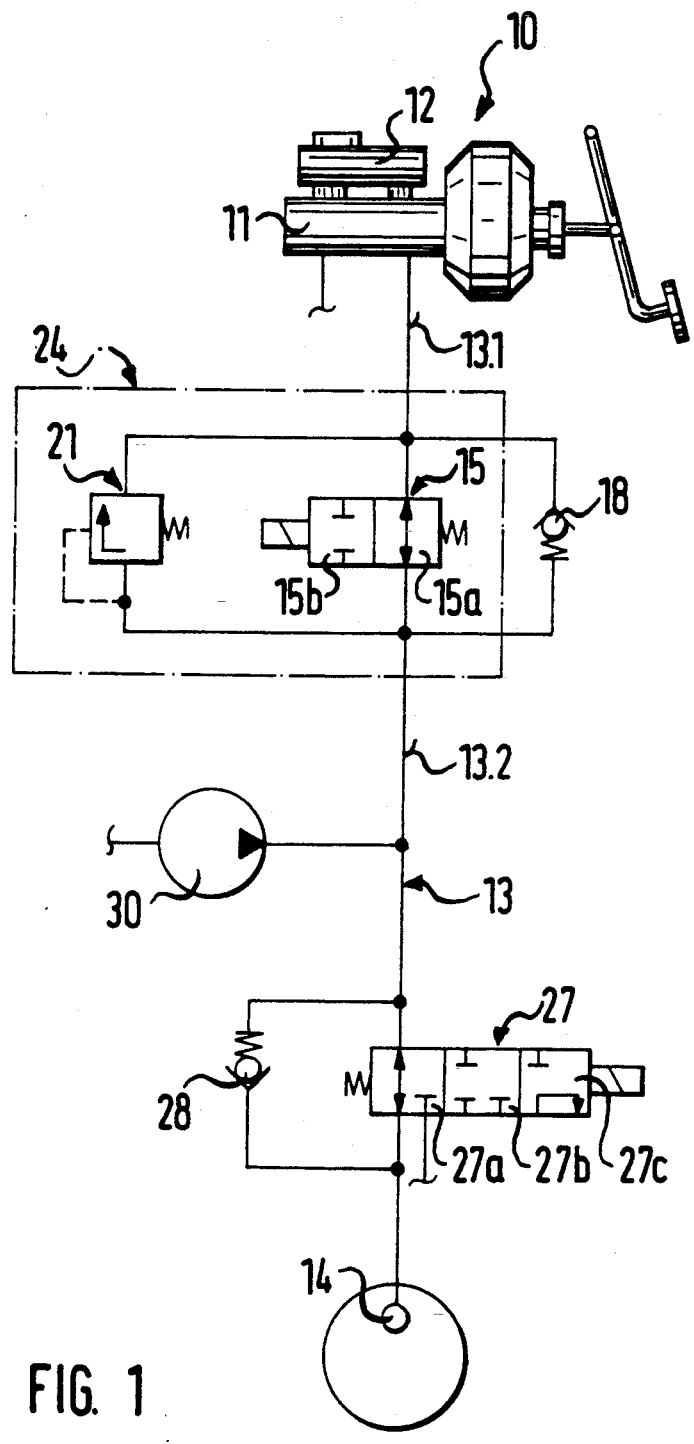
FIG. 1 shows a portion of a circuit diagram of a hydraulic brake system, having a valve unit comprising a shutoff valve and a pressure limiting valve.

The circuit diagram shown in FIG. 1 shows only part of a hydraulic brake system 10 having an antiskid and traction control apparatus.

The brake system 10 has a pedal-actuatable multi-circuit master brake cylinder 10 as its pressure generator, with a pressure fluid reservoir 12. At least one line 13, as a brake line, extends from the master brake cylinder 11 to at least one wheel brake 14, as a consumer. A shutoff valve 15 in the form of a 2/2-way valve is disposed in the line 13. The shutoff valve 15 has an open position 15a, which can be generated by spring actuation, in which quantities of pressure fluid can be displaced between the master brake cylinder 11 and the wheel brake 14. The shutoff valve 15 also has a closing position 15b, which can be generated by electromagnetic actuation. In this closing position 15b, the shutoff valve 15 divides a flow of pressure fluid between a line segment 13.1 of the line 13 toward the master brake cylinder and a line segment 13.2 of this line toward the wheel brake.

A one-way check valve 18 is disposed parallel to the shutoff valve 15 and permits a flow of pressure fluid from the master brake cylinder 11 to the wheel brake 14, bypassing the shutoff valve.

A pressure limiting valve 21 is also connected parallel to the shutoff valve 15. If a predetermined response pressure is exceeded, the pressure limiting valve 21 is capable of opening counter to spring force, so that quantities of pressure fluid can be diverted from the line segment 13.2 to the line segment 13.1 and thus to the master brake cylinder 11. The pressure limiting valve 21 therefore prevents an impermissibly great pressure increase in the region of the brake system 10 toward the wheel brake.

As indicated in dot-dash lines in FIG. 1, the shutoff valve 15 and the pressure limiting valve 21 are structurally and functionally combined into one valve unit 24. This valve unit 24 is described in further detail hereinafter.

A pressure control valve assembly 27, as an element of the anti-skid and traction control apparatus, is also disposed in the line 13, between the shutoff valve 15 and the wheel brake 14. the pressure control valve assembly 27 has a position 27a, which can be generated by spring actuation, in which the line segment 13.2 opens towards the wheel brake 14. The pressure control valve assembly 27 also has a position 27b, adjustable by electromagnet actuation, for holding pressure in the wheel brake 14 and in which position the line segment 13.2 is disconnected from the wheel brake. A third position 27c of the pressure control valve assembly 27, which can likewise be established by electromagnet actuation, serves to divert quantities of pressure fluid from the wheel brake 14 in order to reduce pressure. A one-way check valve 28 is disposed parallel to the pressure control valve assembly 27, with which a flow of pressure fluid from the wheel brake 14 to the master brake cylinder 11, bypassing the pressure control valve assembly, is possible.

A pressure source 30 in the form of a high-pressure pump is also connected to the line segment 13.2. In traction control operation, during which the shutoff valve 15 is switched into its closing position 15b, the pressure source 30 is capable of feeding pressure fluid into the line 13. Since the pressure fluid, in positions 27b and 27c of the pressure control valve assembly 27, cannot be received by the wheel brake 14, the pressure limiting valve 21 opens when its response pressure is exceeded and diverts the pressure fluid to the master brake cylinder 11.

Figure 2:
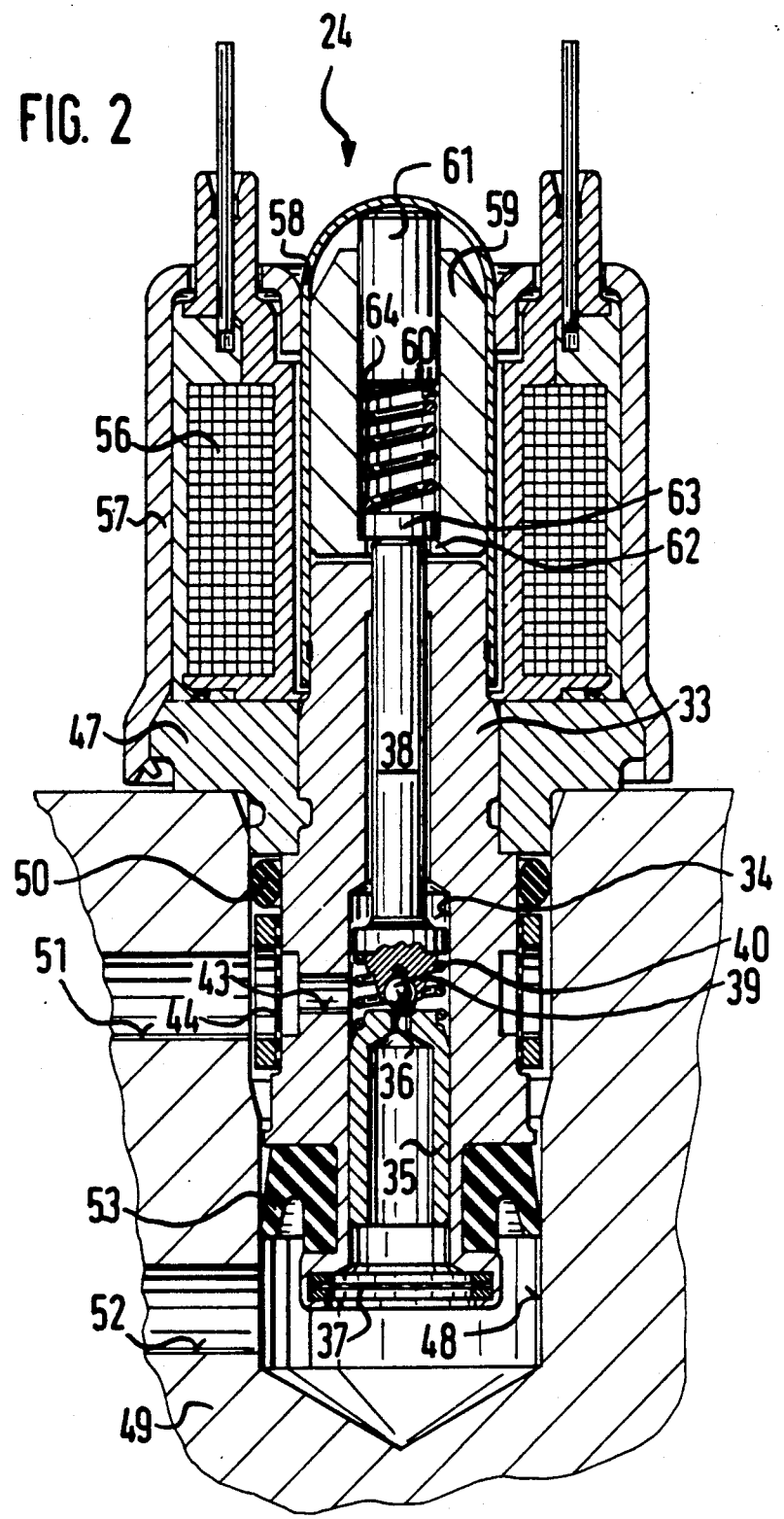
FIG. 2 is a longitudinal section through the valve unit shown in its structural form.

The structure of the valve unit 24 as shown in FIG. 2 is as follows:

A valve housing 33 has a stepped longitudinal bore 34, into the lower region of which a sleeve 35 with a valve seat 36 is pressed. At its lower end, the longitudinal bore 34 is covered by a disk filter 37. Extending in the upper region of the longitudinal bore 34 is a tappet 38, which toward the valve seat carries a closing member 39 in the form of a ball. The valve seat 36 and the closing member 39 form a seat valve. In the drawing this is shown in its open position, which is generated by a restoring spring 40 supported at one end on the valve seat sleeve 35 and at the other on the tappet 38.

The valve housing 33 has a transverse bore 43, which discharges into the longitudinal bore 34 in the region of the valve seat 36. The transverse bore 43 is covered by a sleeve filter 44 that encircles a cylindrical groove in the valve housing 33.

The valve housing 33, joined to a flange 47, engages the inside of a receiving bore 48 in a housing block 49. (The fastening of the valve unit 24 to the housing block 49 is not shown in the drawing). The receiving bore 48 is closed in a pressure-fluid-tight manner toward its mouth by a sealing ring 50 seated on the valve housing 33. A bore 51 discharges in the region of the transverse bore 43, and at the lower end of the valve housing 33 a bore 52 discharges into the receiving bore 48 of the housing block 49. The bore 51 is equivalent to the line segment 13.1 arriving from the master brake cylinder 11, while bore 52 corresponds to the line segment 13.2 leading to the wheel brake 14. A cuff 53, received on the valve housing 33 between the two bores 51 and 52, in cooperation with the receiving bore 48, embodies the check valve 18.

The flange 47 of the valve unit 24 carries an electrical coil 56, over which a cup-shaped housing jacket 57 joined to the flange 47 fits. Extending inside the coil 56 is an armature guide sleeve 58 joined to the valve housing 33 in a pressure-fluid-tight manner. An armature 59 is received longitudinally movable in the armature guide sleeve 58. The armature has a blind bore 60 extending coaxially with the tappet 38. The depth of the blind bore 60, which is open toward the tappet 38, is determined by a press-fit bolt 61 extending coaxially in the armature 59. Toward the tappet, the blind bore 60 has a bore shoulder 62 that narrows its cross section. A circular-cylindrical disk 63 and a prestressed compression spring 64 are located inside the blind bore 60. The compression spring 64 engages the press-fit bolt 61 at one end and the disk 63 at the other; in the open position of the seat valve 36, 39 shown, the disk 63 in turn is supported on the bore shoulder 62. The prestressing of the compression spring 64 is adjustable by the insertion depth of the press-fit bolt 61 in the armature 59. The disk 63 serves as an intermediate member between the compression spring 64 and the tappet 38 that under the influence of the restoring spring 40 engages the disk. The prestressing force of the compression spring 64 is greater than that of the restoring spring 40. Between the end faces facing one another of the armature 59 and the valve housing 33 is an air gap, corresponding to the armature stroke, the width of the gap being greater than the length of the stroke that the closing member 39 executes from the position shown until it contacts the valve seat 36.

When current is supplied to the coil 56, a magnetic field is generated that exerts a force upon the armature 59 and displaces it toward the valve housing 33. In this process, the disk 63 carries the tappet 38 with it, overcoming the restoring force 40. In the course of movement of the armature 59, the closing member 39 strikes the valve seat 36 of the sleeve 35. This terminates the motion of the tappet 38. Since the armature 59 has not yet executed its complete stroke and is therefore continuing to move toward the valve housing 33, the disk 63 lifts away from the bore shoulder 62, overcoming the prestressing force of the compression spring 64. While until now the flow of force of the compression spring was closed via the disk 63, the armature 59 and the press-fit bolt 61, at the end of the armature stroke the compression spring 64 executes an axial force upon the tappet 38. This force, transmitted by the tappet 38 to the closing member 39, is less than the magnetic force of the armature 59 and acts as a closing force adapted to the response pressure of the pressure limiting valve 21.

When the closing member 39 engages the valve seat 36, the valve unit 24 performs both the function of the shutoff valve 15 in its closing position 15b and the function of the pressure limiting valve 21.

If there is an impermissibly great pressure increase on the part of the bore 52, then when the response pressure of the pressure limiting valve 21 is reached, the closing member 39 lifts away from the valve seat 36 counter to the force of the compression spring 64, so that pressure fluid can flow out to the bore 51.

When the supply of current to the coil 56 is ended, the magnetic field collapses, and the armature 59 is initially moved upward by the influence of the compression spring 64, until the disk 63 contacts the bore shoulder 62. Next, the restoring spring 40 takes on the task of returning the armature 39 and tappet 38 to the initial position, in which the shutoff valve 15 assumes its open position 15a and the pressure limiting valve 21 is not operative. Foreign bodies that have settled on the valve seat 36 when the pressure limiting function became operative are now flushed out by the pressure fluid in the course of the complete valve stroke.

The foregoing relates to a preferred exemplary embodiment of the invention, it being understood that other variants and embodiments thereof are possible within the spirit and scope of the invention, the latter being defined by the appended claims.

What is claimed and desired to be secured by letters patent of the United States is:

1. A hydraulic brake system (10) having an anti-skid and traction control apparatus for motor vehicles, a brake line (13) that extends between a master brake cylinder (11) and a wheel brake (14) for carrying pressure fluid to said wheel brake, a shutoff valve (15) disposed in the brake line (13), said shutoff valve includes a valve housing (33), a bore (34) in said valve housing, a sleeve (35), and a tappet (38) in said bore (34), a valve seat (36) on an upper end of said sleeve (35), a closing member (39) on a lower end of said tappet, said tappet engages an armature (59) which forces the closing member (39) onto the valve seat (36) by action of a magnetic force, a restoring spring (40) is supported firmly by a lower end on an upper end of said sleeve (35) and has an upper end that engages said tappet (38), the armature (59) has a blind bore (60), defined by a press-fit bolt (61), a prestressed compression spring (64) is received in said blind bore (60) and is supported on one end of the armature (59) via the press-fit bolt (61) and on the other end exerts a force upon an intermediate element (63) which is supported on a bore step (62) of the armature (59) and connected to the tappet (38), the prestressing force of the compression spring (64) received in the armature (59) is greater than a force of the restoring spring (40), in a closing process of the shutoff valve (15) the armature (59) is moved solely by an action of a magnetic force to overcome the restoring spring (40) until an engagement of the closing member (39) with the valve seat (36), and subsequently overcomes only the prestressed compression spring (64) until a full stroke of the armature (59) has been executed, a high-pressure pump (30) connected between the shut-off valve (15) and the wheel brake that feeds a pressure fluid into the brake line (13), and a pressure limiting valve (21) connected to the shutoff valve (15), in which the pressure fluid is diverted to the master brake cylinder (11) by said pressure limiting valve if a response pressure from said pump is exceeded, said compression spring (64) is disposed within said blind bore in the armature between a bottom of the blind bore in the armature (59) and the closing member (39) of the shutoff valve (15) which in a valve closing position said compression spring (64) exerts a force, according to a response pressure, upon the closing member (39).

2. A hydraulic brake system as defined by claim 1, in which a depth of the blind bore (60) is determined by said press-fit bolt (61) extending coaxially in the armature (59).

* * * * *